United States Patent
Kay et al.

(10) Patent No.: US 10,097,598 B2
(45) Date of Patent: Oct. 9, 2018

(54) MEETING MANAGEMENT SYSTEM

(71) Applicant: NOWHERE DIGITAL LIMITED, Derby, Derbyshire (GB)

(72) Inventors: Bozwell Kay, Lustleigh (GB); Marc Cornwell, Aldsworth (GB); Nicholas Udall, Surrey (GB)

(73) Assignee: NOWHERE DIGITAL LIMITED, Surrey (GB)

( * ) Notice: Subject to any disclaimer, the term of this patent is extended or adjusted under 35 U.S.C. 154(b) by 103 days.

(21) Appl. No.: 13/950,746

(22) Filed: Jul. 25, 2013

(65) Prior Publication Data

US 2014/0068463 A1    Mar. 6, 2014

(30) Foreign Application Priority Data

Jul. 25, 2012 (GB) .................................. 1213263.5

(51) Int. Cl.
*H04L 29/06* (2006.01)
*H04L 12/18* (2006.01)

(52) U.S. Cl.
CPC ........ *H04L 65/403* (2013.01); *H04L 12/1818* (2013.01); *H04L 12/1822* (2013.01); *H04L 12/1827* (2013.01)

(58) Field of Classification Search
CPC ............. H04L 65/4038; H04L 65/4046; H04L 12/1818; H04L 12/1822; H04L 12/1827; H04L 65/403
USPC ..................... 715/753, 755, 755 S
See application file for complete search history.

(56) References Cited

U.S. PATENT DOCUMENTS

| | | | | |
|---|---|---|---|---|
| 5,557,725 A * | 9/1996 | Ansberry | ............... | G06F 9/4443 379/202.01 |
| 6,795,093 B1 * | 9/2004 | Chesley | ............... | H04L 12/1831 715/733 |
| 7,124,164 B1 * | 10/2006 | Chemtob | ............... | G06Q 10/10 709/204 |
| 7,516,411 B2 * | 4/2009 | Beaton | ................. | G06Q 10/107 715/753 |
| 7,814,426 B2 * | 10/2010 | Huesken | ................. | G06F 9/465 715/741 |
| 8,091,034 B2 * | 1/2012 | Barbee | ................ | H04L 12/1827 715/751 |
| 8,458,057 B1 * | 6/2013 | Youngs | .............. | G06Q 10/1095 705/32 |
| 8,887,069 B2 * | 11/2014 | Tipirneni | ................ | G06F 3/011 709/204 |

(Continued)

OTHER PUBLICATIONS

"Input", "server" definitions: IEEE 100, The Authoritative Dictionary of IEEE Standards Terms, 7th edition, copyright 2000 by The Institute of Electrical and Electronics Engineers. ISBN 0-7381-2601-2. pp. 556-559, 1031-1034.*

(Continued)

*Primary Examiner* — David Choi
(74) *Attorney, Agent, or Firm* — Nixon & Vanderhye P.C.

(57) ABSTRACT

The present invention relates to a meeting management system including an interface for defining the structure of a meeting, an unstructured waiting space to facilitate communication between participants, an interface to display the structure, process and timings of a meeting, a check-in/out process, an input and exchange process, and a task allocation process.

20 Claims, 17 Drawing Sheets

(56) References Cited

U.S. PATENT DOCUMENTS

| | | | | |
|---|---|---|---|---|
| 2005/0027800 A1* | 2/2005 | Erickson | G06Q 10/10 | 709/204 |
| 2007/0100939 A1* | 5/2007 | Bagley | G06Q 10/10 | 709/204 |
| 2009/0094532 A1* | 4/2009 | Lyle | G06Q 10/109 | 715/753 |
| 2009/0288007 A1* | 11/2009 | Leacock | G06Q 10/10 | 715/716 |
| 2009/0307610 A1* | 12/2009 | Ryan | G06Q 10/00 | 715/756 |
| 2009/0319912 A1* | 12/2009 | Serr | H04L 12/1827 | 715/753 |
| 2010/0085416 A1* | 4/2010 | Hegde | H04N 7/147 | 348/14.08 |
| 2010/0251140 A1* | 9/2010 | Tipirneni | G06F 3/011 | 715/753 |
| 2010/0251177 A1* | 9/2010 | Geppert | G06F 3/04817 | 715/821 |
| 2010/0257460 A1* | 10/2010 | Zaner | G06Q 10/10 | 715/753 |
| 2010/0318399 A1* | 12/2010 | Li | G06Q 10/109 | 705/7.18 |
| 2011/0022968 A1* | 1/2011 | Conner | G06Q 10/10 | 715/753 |
| 2011/0185286 A1* | 7/2011 | Moyers | G06Q 10/10 | 715/752 |
| 2012/0030263 A1* | 2/2012 | John | G06F 17/30038 | 707/825 |
| 2013/0070045 A1* | 3/2013 | Meek | G06Q 10/06 | 348/14.07 |
| 2014/0068463 A1* | 3/2014 | Kay | H04L 65/403 | 715/753 |

OTHER PUBLICATIONS

"Phase", "stage" definitions: 2011, The American Heritage Dictionary of the English language, Houghton Mifflin, retrieved from Credo Reference on Jan. 21, 2016, 8 pgs.*

* cited by examiner

MEETING MANAGEMENT SYSTEM

This application claims priority to GB Application No. 1213263.5, filed 25 Jul. 2012, the entire contents of which is incorporated herein by reference.

FIELD OF INVENTION

The present invention is in the field of meeting management systems. In particular, but not exclusively, the present invention relates to meeting management systems for online video-conferencing.

BACKGROUND

Video conferencing enables individuals to speak with one another remotely. Some video conferencing systems also facilitate the sharing of data such as documents or images.

One example of a video conferencing system is Skype™. Skype™ permits users to add contacts and manage contacts in an address book. Skype™ enables users to initiate a text chat, voice or video conference with one or more of their contacts by clicking on a set of simple buttons. While in a video conference, users' screens can be shared with one another.

Video conferencing systems are sometimes used as a replacement for meetings when it is inconvenient to arrange a place and time where all participants for a meeting can meet.

However, meetings held using a video conferencing system lose the behavioural cues of physical meetings and consequently meetings held using video conferencing systems can be less efficient and less effective than face-to-face meetings.

There is a desire for an improved meeting management system for video conferencing which augments traditional video conferencing to facilitate more efficient and more effective meetings.

There exist some systems which aim to address this desire, one of these is GoToMeeting™. This system enables users to start an online meeting space and invite participants. It provides the ability to schedule meetings beforehand, which conventional video conferencing systems, such as Skype™ do not. It also enables users to grant keyboard and mouse functionality over their computer system to others in the conference.

Another such system is WebEx™ by Cisco™. WebEx™ provides a mechanism to enable users to construct a webinar. A webinar is an online space where a participant (the "presenter") can speak and many participants can observe. Once a user is signed up, webinars can be scheduled much as meetings are in GoToMeeting™. Text, audio and video conferencing is provided within WebEx™. Some users repurpose WebEx™ to conduct meetings.

None of these existing systems provide an adequate replacement for face-to-face meetings. Furthermore, none of these existing systems permit users to organise or structure complex meetings.

In addition, during face-to-face meetings there is often a requirement to record and allocate tasks.

There is a desire to provide this functionality efficiently and effectively for online meetings.

One system for task management is called Basecamp™. Basecamp™ permits users to create projects, tasks and milestones. A task is created within a project, the task can be assigned to a user and the task can relate to a milestone.

However, Basecamp™ is not integrated into a meeting management system. Therefore, the process of creating projects, tasks, and milestones is undertaken by a user after a meeting has taken place.

Therefore, there is a need for a task management system which is closely integrated into a meeting management system.

It is an object of the present invention to provide a meeting management system which overcomes the disadvantages of the prior art, or at least provides a useful alternative.

SUMMARY OF INVENTION

According to a first aspect of the invention there is provided a meeting management method, including the step of:
receiving input from a user to define a format of a meeting; wherein the user selects from a predefined list of possible stages within the meeting and wherein the user can select multiple instances of each stage.

According to a further aspect of the invention there is provided a meeting management method, including:
a) displaying representations for a plurality of users within a GUI of a system in an unstructured layout, wherein the plurality of users correspond to participants in an upcoming meeting;
b) the plurality of users communicating with one another within the system in an unstructured manner; and
c) the system receiving input from at least one of the users to determine when a structured meeting will begin.

According to a further aspect of the invention there is provided a meeting management method, including:
a) generating a plurality of nodes corresponding to stages for a meeting; and
b) displaying an indicator identifying the node corresponding to the current stage of the meeting.

According to a further aspect of the invention there is provided a meeting management method, including:
a) displaying a plurality of meeting participants within a GUI within a device of each participant, wherein the participants are arranged in a layout defined by one of the participants; and
b) each of the meeting participants having the opportunity to provide input, wherein each participant has the opportunity to provide input in accordance with the layout.

According to a further aspect of the invention there is provided a meeting management method, including:
a) a designated meeting participant providing input which is then transmitted to each of a plurality of participants via a communications platform;
b) the designated meeting participant indicating an end to providing the input within the platform;
c) two or more of the plurality of participants indicating an intention to provide input within the platform; and
d) determining selection of a further meeting participant to provide input in accordance with a first selection method within the platform.

According to a further aspect of the invention there is provided a meeting management method, including:
receiving input from one of a plurality of participants to a meeting to allocate a task to another one of the plurality of participants;
where each participant can communicate with each other during task allocation.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a meeting management system for creating and managing meetings within a video conferencing system.

Figure 1:
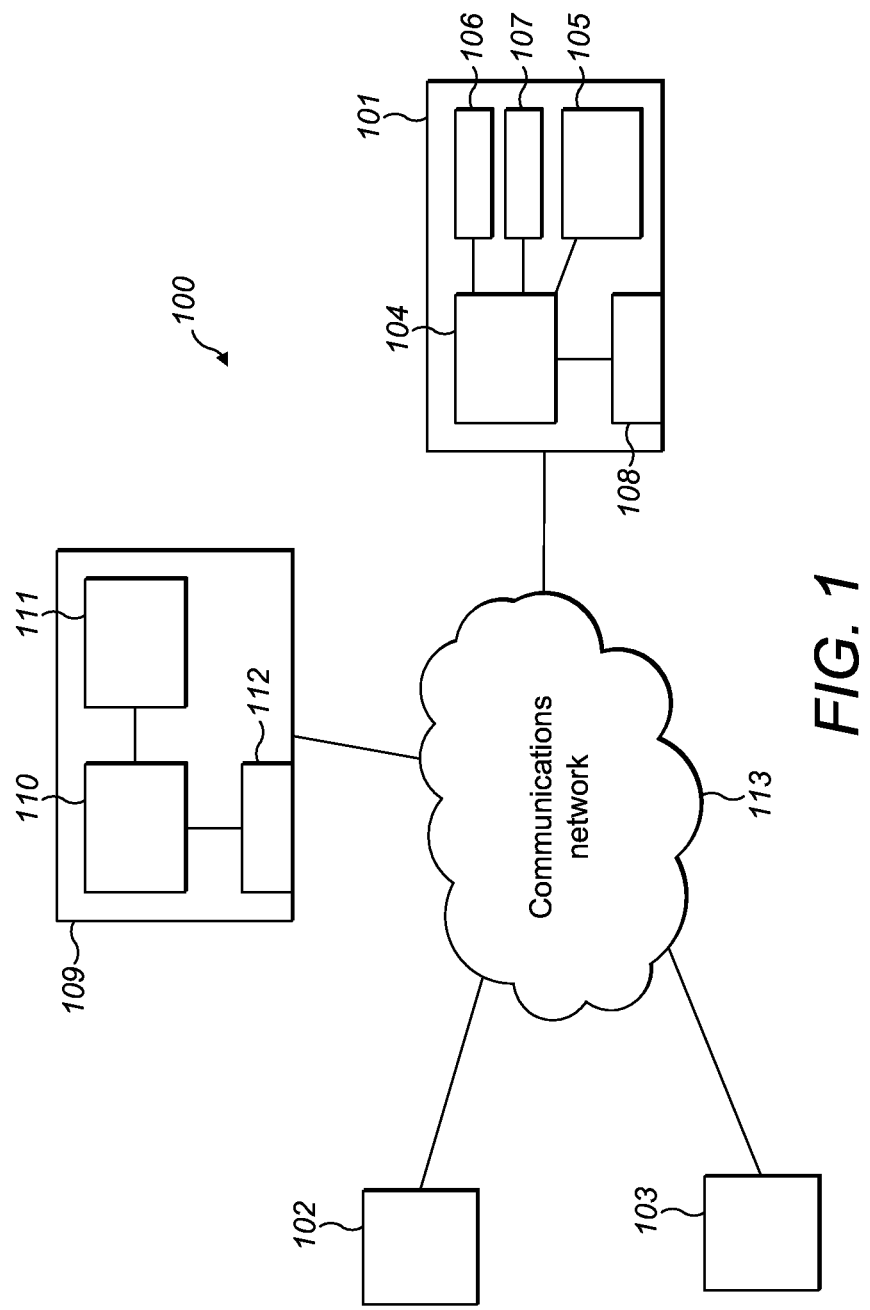
FIG. 1: shows a system in accordance with an embodiment of the invention.

In FIG. 1, a system 100 in accordance with an embodiment of the invention is shown.

The system 100 includes a plurality of user devices 101, 102, 103. Each user device includes a processor 104, a memory 105, an input device 106, an output device 107, and a communications module 108.

The input device 106 may be an audio-visual input device such as a webcam and a microphone. The output device 107 is preferably a display device such as a video screen.

The processor 104 may be configured to manage the output device 107 to display a graphical user interface and to manage the input device 106 to receive interaction from a user.

The system 100 also includes a server 109. The server 109 includes a processor 110, a memory 111, and a communications module 112.

The server 109 may be configured to manage communications between the user devices 101, 102, 103, such as audio-visual communications.

The user devices 101, 102, 103, are configured to communicate with the server 109 through a communications network 113, such as a local area network (LAN), wireless location area network (WLAN), the Internet, or any other communications network or combination of networks.

Figure 2:
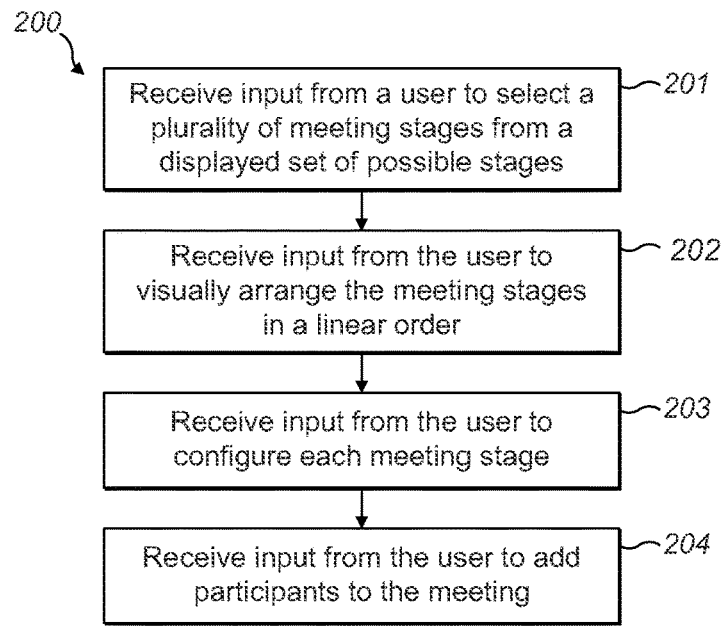
FIG. 2: shows a meeting creation method in accordance with an embodiment of the invention.

In FIG. 2, a meeting creation method 200 in accordance with an embodiment of the invention is shown.

This method provides a user with the ability to construct a structure for a meeting.

A user defines a format of a meeting within the graphical user interface on a user device. The format of a meeting may comprise multiple stages. The stages may be selected, in step 201, from a visual list of stage-types including: a meeting participant check-in stage, a stage for meeting participants to provide input for transmission to the other meeting participants, an exchange stage to enable meeting participants to interact with one another, a task allocation stage to enable meeting participants to allocate tasks between them, and meeting participant check-out stage.

In step 202, the interface may enable the user to arrange the stages in a linear meeting structure.

The interface may enable the user to define multiple versions of each type of stage.

Each stage may also include various configurations, and the interface may enable a user to configure the stages in step 203. Examples of various configurations will be described later in the specification.

In step 204, the user may add meeting participants to the meeting by selecting a team comprising predefined participants and/or by adding participants.

The meeting format may be transmitted to the server for storage.

Different stages can be constructed for use by the user. For example, a developer can create new stages comprising new configurations. Some stage may be hard-coded into the meeting management system and other stages may be defined using a plugin framework that includes code and data.

Figure 3:
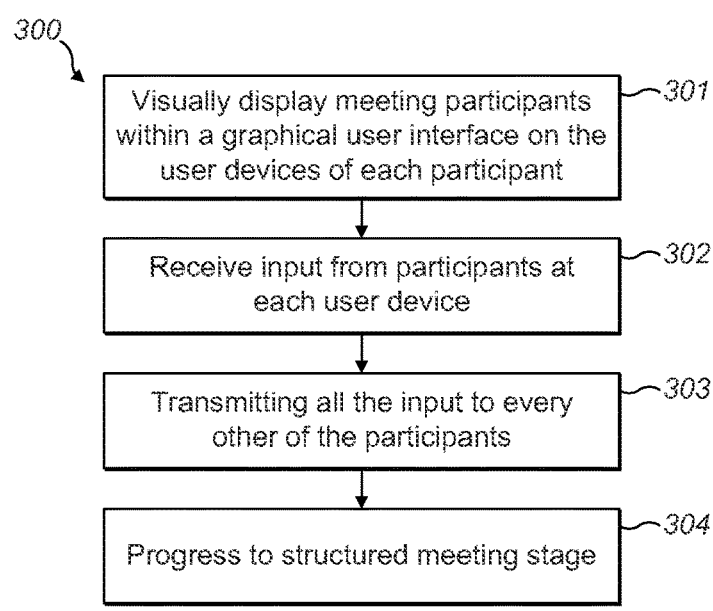
FIG. 3: shows a pre-meeting communication method in accordance with an embodiment of the invention.

In FIG. 3, a pre-meeting communication method 300 in accordance with an embodiment of the invention is shown.

This method describes an interface to enable participants to communicate online with one another in an unstructured communication process before proceeding to a structured communication process within a meeting.

Within the graphical user interface on each user device, a representation for the plurality of participants of the meeting (i.e. the users of the device) are visually displayed in step

301. The representations may be displayed in an unstructured format, that is, without a specific relationship between the representations.

In step 302, the user devices receive input from the plurality of participants and transmit this to the server. The server coordinates delivery of the input for output at each of the user devices in step 303. Therefore, each of the participants can communicate with every other participant simultaneously.

The system receives input from at least one of the participants via their user device to determine when a structured meeting will begin. In step 304, a structured meeting may then be displayed in accordance with FIG. 4.

Figure 4:
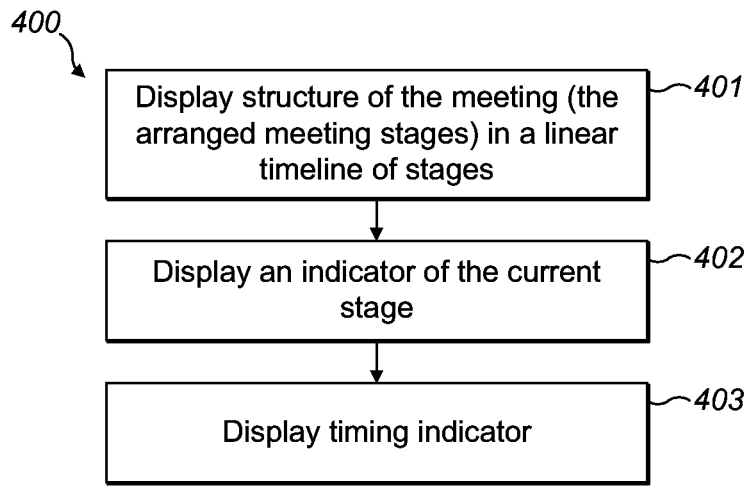
FIG. 4: shows a meeting structure, progress and timing method in accordance with an embodiment of the invention.

In FIG. 4, a meeting structure, progress and timing method 400 in accordance with an embodiment of the invention is shown.

This method describes an interface for displaying the structure of a meeting in step 401. As described in relation to FIG. 2, the structure or format of the meeting may comprise multiple stages of different types.

In the interface, the meeting structure may be displayed as a time-line from the first stage to the last stage. Each stage may be displayed as a node within this time-line.

During the meeting, the current stage may be indicated within the interface in step 402. For example, the node may be highlighted or otherwise indicated within the time-line.

A timing indicator may also be displayed, in step 403, for each stage or for the entire meeting. The timing indicator may indicate how much time remains for that stage or for the entire meeting.

Separate timing indicators may be shown for each stage. Where a timing indicator is shown for the entire meeting, this indicator may reflect time overruns within the stage time indicators.

Figure 5:
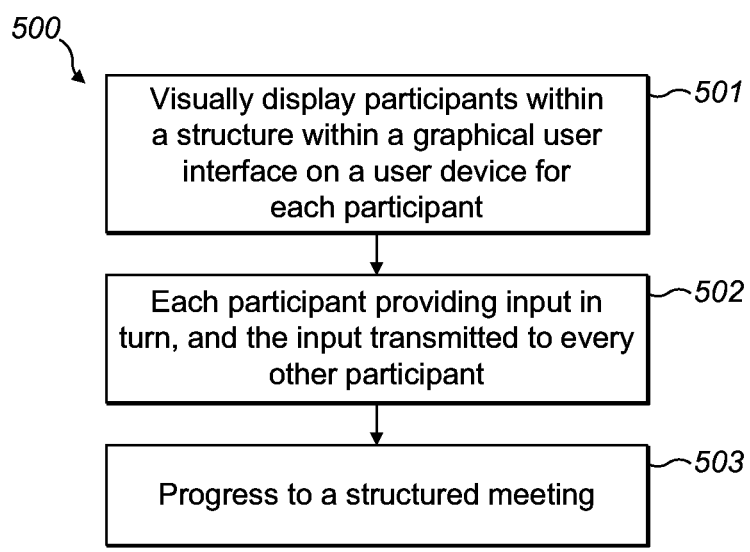
FIG. 5: shows a meeting check-in method in accordance with an embodiment of the invention.

In FIG. 5, a meeting check-in method 500 in accordance with an embodiment of the invention is shown.

This method describes a system to enables participants to interact in a structured way before and/or after a meeting.

An interface is provided for each participant to show all the participants of the meeting in step 501. The participants may be shown as icons, photographs, or video-streams.

The participants may be displayed within the interface in accordance with a layout predefined by one of the participants.

The method includes the step of one or more of the participants providing input in accordance with the layout in step 502. For example, if the layout is a circle, each participant may be given the opportunity to provide input in a clockwise or counter-clockwise direction from a first participant.

At the close of this input session, the participants may progress to a structured meeting in step 503.

Figure 6:
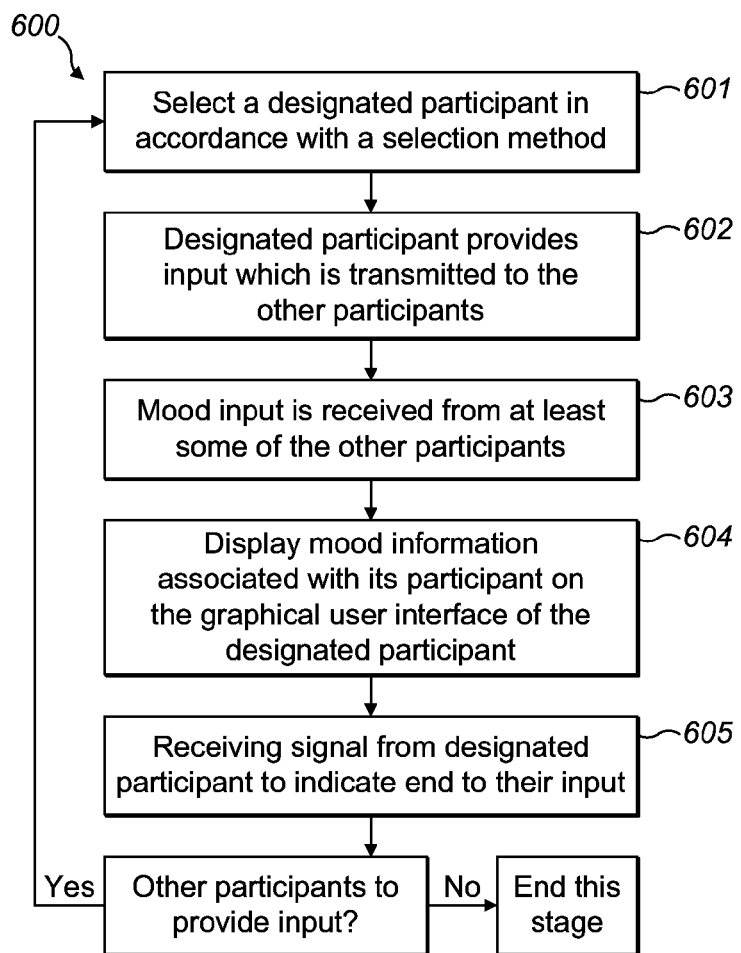
FIG. 6: shows a meeting communication facilitation method in accordance with an embodiment of the invention.

In FIG. 6, a meeting communication facilitation method 600 in accordance with an embodiment of the invention is shown.

The method describes structured communication between the participants in accordance with a method predefined for the meeting by one of the participants.

An interface is provided which enables a designated meeting participant to be selected in accordance with a selection method in step 601 and the designated meeting participant to provide input, in step 602, which is transmitted to a plurality of participants to a meeting.

In step 603, the other participants may indicate a mood using their interface (for example, by actuating a button), and visually displaying the mood for that participant within the GUI of the other participants including the designated meeting participant in step 604. This may be useful in providing immediate feedback to the designated meeting participant of their input.

The mood may be visually displayed as a colour modification of an existing GUI element or as an icon. The mood may visually displayed for a specific time period. For example, the mood may be displayed for no more than the amount of time it would be necessary for a typical user of the interface to detect (i.e. a few seconds).

The interface of the designated meeting participant provides a mechanism to enable the designated meeting participant to signal an end to the provision of input in step 605.

Other participants can indicate if they wish to contribute, either by providing input, or asking questions. The participants may indicate this wish by actuating a button within their interface in step 606.

Once an end to the designated meeting participant's input is signalled, there is a return to step 601 where the selection method selects another participant to provide input.

The selection method may involve the designated meeting participant, or administrator (the user who created the meeting) selecting the participant. In one embodiment, the selection method selects the first participant to actuate their button.

Figure 7:
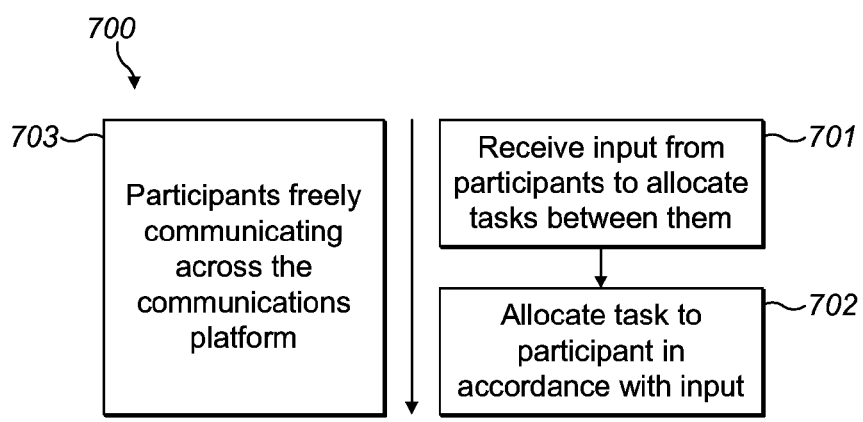
FIG. 7: shows a task allocation method in accordance with an embodiment of the invention.

In FIG. 7, a task allocation method 700 in accordance with an embodiment of the invention is shown.

This method describes the allocation of task following a meeting.

An interface is provided which receives input from participants to generate and/or allocate tasks in step 701. Tasks may be allocated to one or more of the participants in step 702. In step 703 and contemporaneously with task allocation, the interface may provide for participants to communicate with one another (for example, via a video conferencing system).

The tasks may comprise a title and due date.

One possible implementation of the invention will now be described with reference to FIGS. 8 to 18 which represent screenshots of the implementation.

The current implementation will describe the process of creating teams for a conference (or meeting), defining the conference, and managing the conference in accordance with its definition.

The conference is an audio or video conference, and communication between the participants is via a video or audio channel. Communication is managed for each phase in accordance with the descriptions below and may involve the restriction of communication from only one participant to the others at a time or free communication permitting participants to communicate with one another simultaneously.

The user who creates the conference will be termed the conference administrator.

During the conference, each participant views a screen showing features of the conference and avatars representing the other participants. The avatars may be displayed in a different configuration for each phase to provide additional context to each participant about that particularly phase of the conference.

The features of the conference may include a timeline illustrating the structure of the conference (a progression of phases) and progress through the conference by indicating which is the current phase.

Other features of the conference may be an overall timer to provide visual feedback to participants about the timeframe for the conference. Phase-specific timers may also be provided when a phase is current to indicate an expected time for that phase to the participants. The calculations for the timer will be described later in this document.

Figure 8:
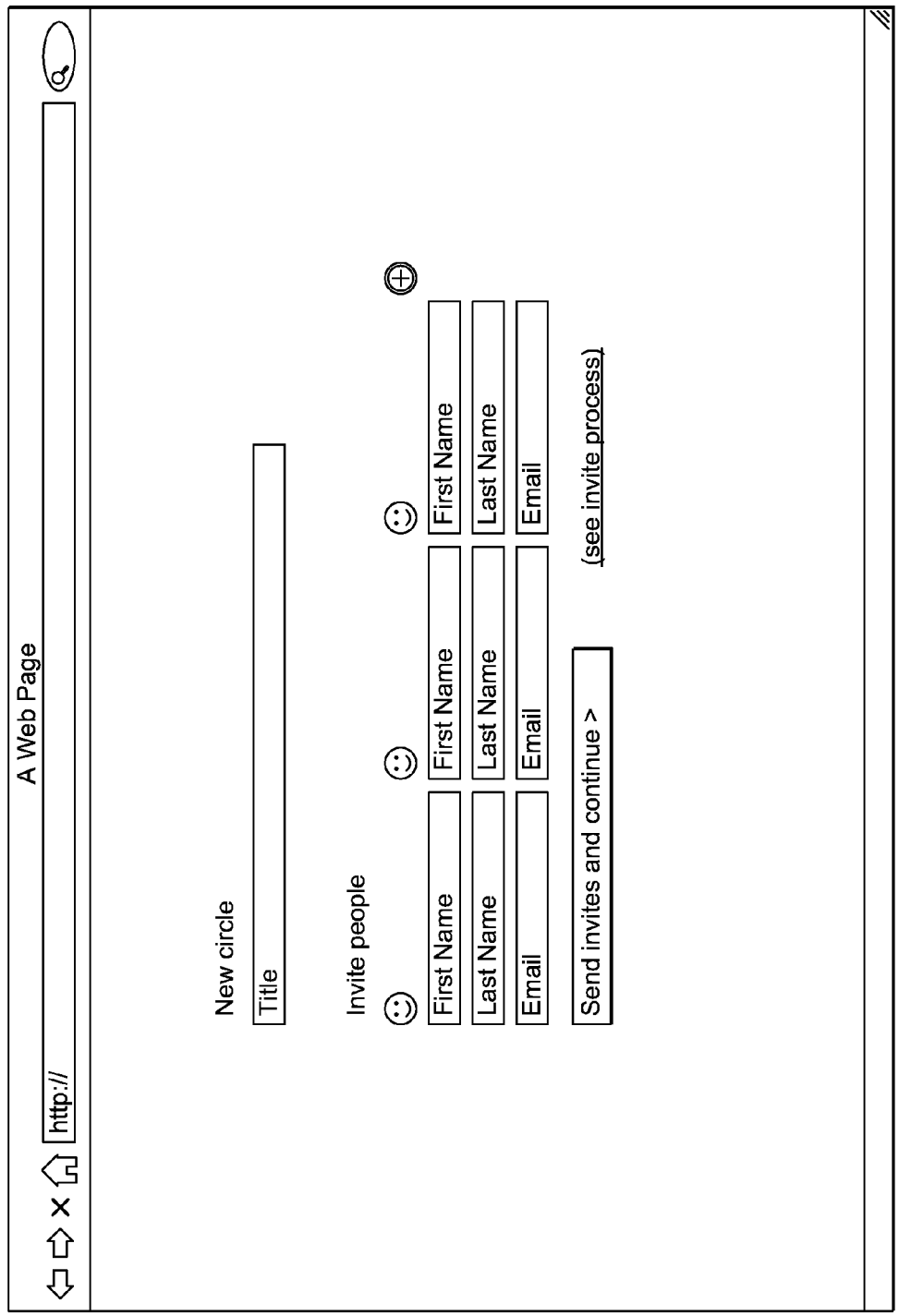
FIG. 8: shows a screenshot of the interface for team creation in accordance with an embodiment of the invention.

In the first instance, a user (i.e. the conference administrator) may create a team. The interface for creating the team is shown in FIG. 8. The team forms the basis for future meetings created within the system. The administrator selects a name for the team and invites members. The user may provide further information about the team, such as purpose and location, or future information about its members, such as job position.

The team members receive notification of the invitation. If the team member has registered with the system previously, the team member is invited to login to participant in any scheduled meetings, otherwise, the team member must register.

To register, the team members provide email, username and password information. Additional profile information, such as a picture, may also be provided.

The administrator may also create a conference. The conference may be given a name, date, time and duration.

Participants are selected and invited by the administrator. Alternatively or in addition, a team may be selected and the members of the team are defined as participants.

Figure 9:
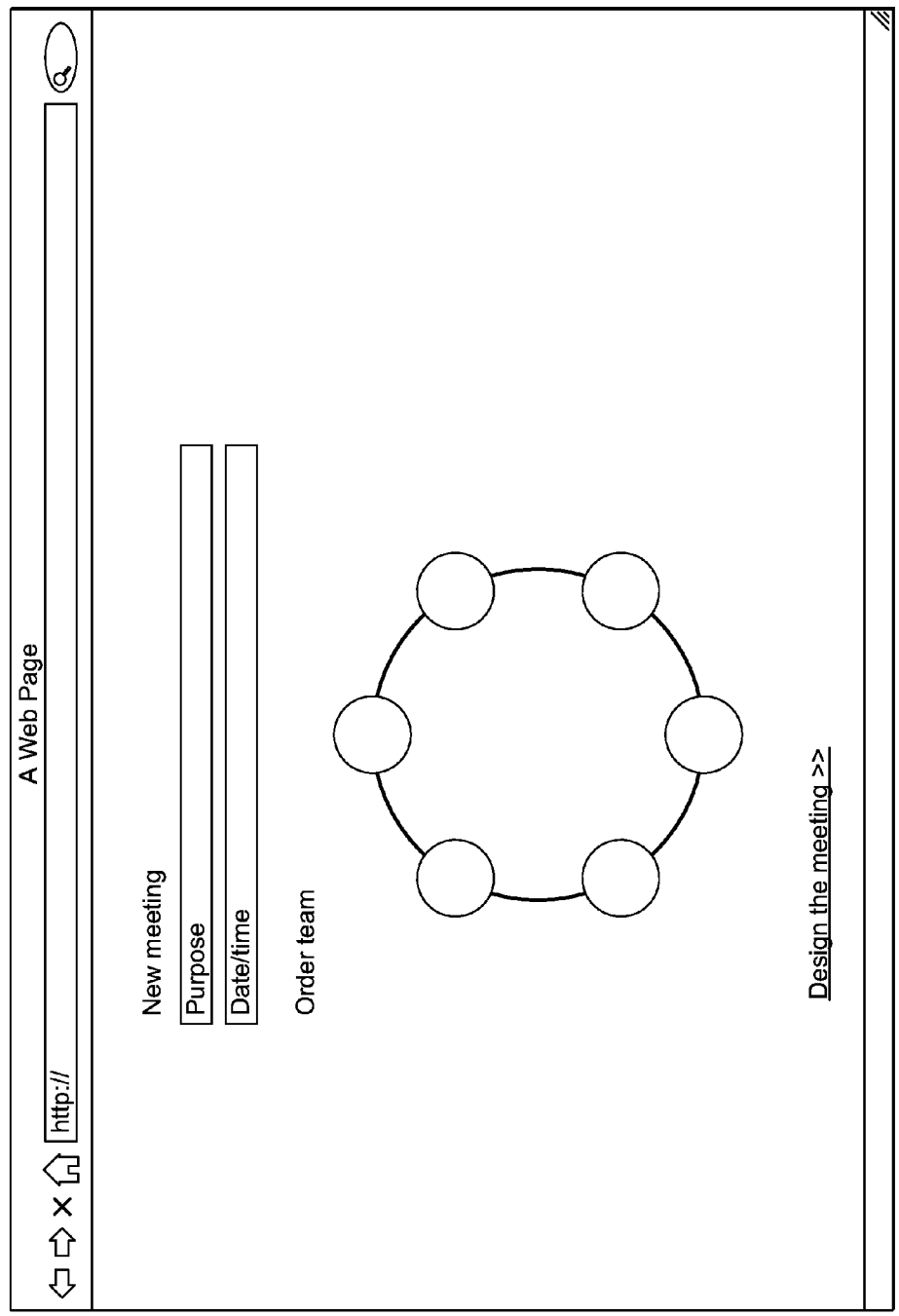
FIG. 9: shows a screenshot of the interface for meeting/conference creation in accordance with an embodiment of the invention.

The participants may be ordered by the administrator as shown in the screenshot for the interface in FIG. 9.

The participants may be permanent members (who are members of the team) or temporary members (who are only invited for a particular meeting).

Avatars representing the participants are arranged in a circle automatically in accordance with the ordering defined by the administrator.

The ordering of the participants within the circle may result in different outcomes. For example, the order within the circle may designate the next conference administrator if the current administrator leaves and/or define which participant contributes next during specific stages (such as the check-in stage, described later).

The next step is the design of the conference.

Figure 10A:
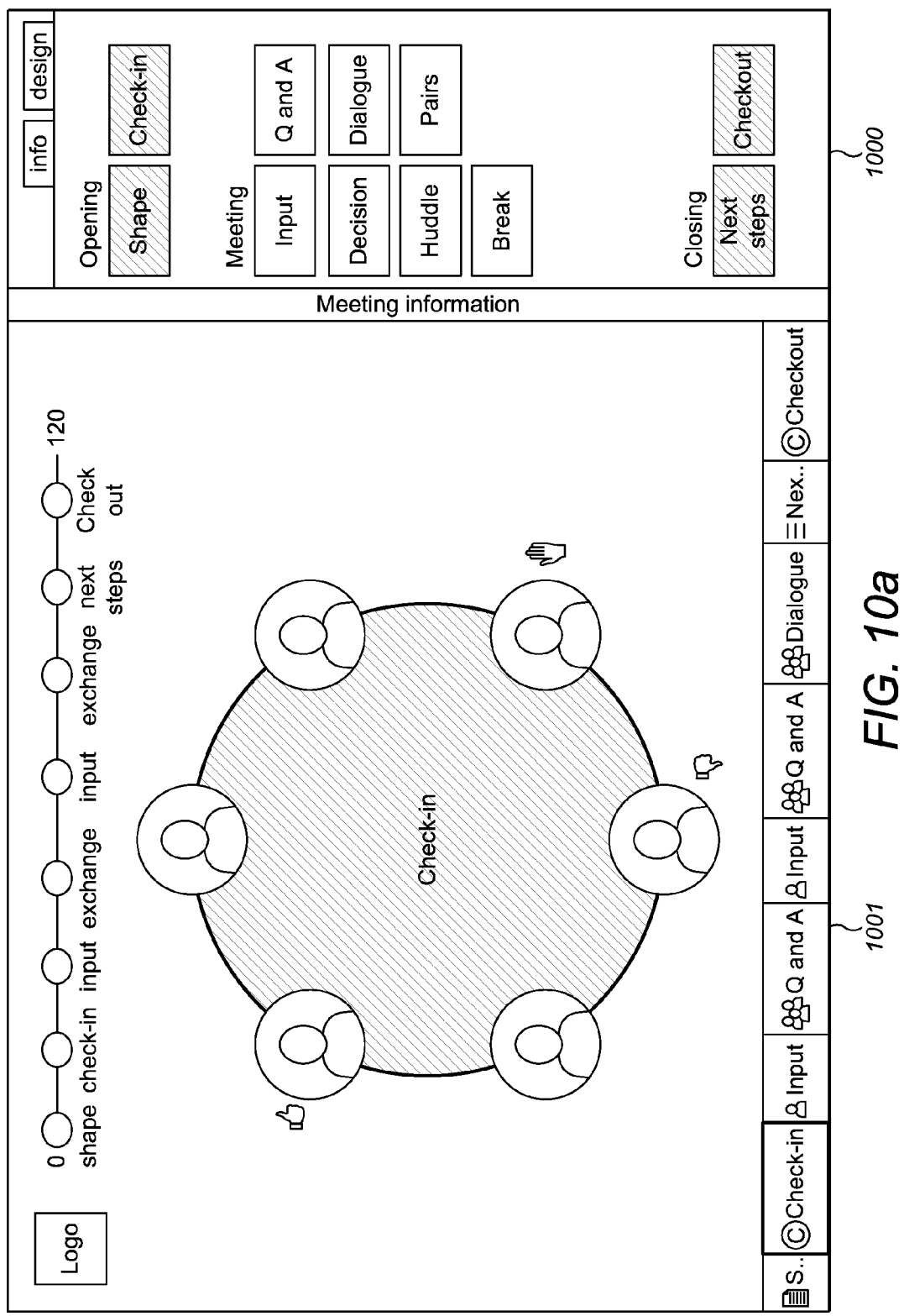
FIG. 10a: shows a screenshot of the interface for the meeting/conference builder/designer in accordance with an embodiment of the invention.

In this step, the administrator selects and orders the phases of the conference using a conference builder as shown in the screenshot in FIG. 10a.

The administrator may have the option of selecting predefined conferences from conference templates—for example: 'operational', 'strategic' or 'creative'. In the examples given all the stages have a check-in, next steps and checkout stage. An operational meeting template may have a series of input stages of long duration (number specified by the administrator) with short duration Q and A exchange stages; a strategic meeting template may have a series of input stages of medium duration (number specified by the administrator) with medium duration Q and A stages followed by dialogue stages; and a creative meeting template will have a number of short duration input stages (number specified by the administrator), then long duration dialogue stages. All the input, exchange and dialogue stages occur after the check-in stage and before the next steps and check-out stages.

Alternatively, the administrator can choose to begin with a blank conference and build it without a template.

Once the template or the blank conference option selected, the conference builder as shown in FIG. 10a is loaded and presented to the administrator on a graphical user interface on the administrator's device. Phases can be added by the administrator by dragging and dropping from the right hand panel 1000 into the phases listed at the bottom 1001.

Options or parameters for each phase can be altered by first clicking or selecting the phase in the bottom listing 1001. The options/parameters are then displayed for the administrator to make changes.

Figure 10B:
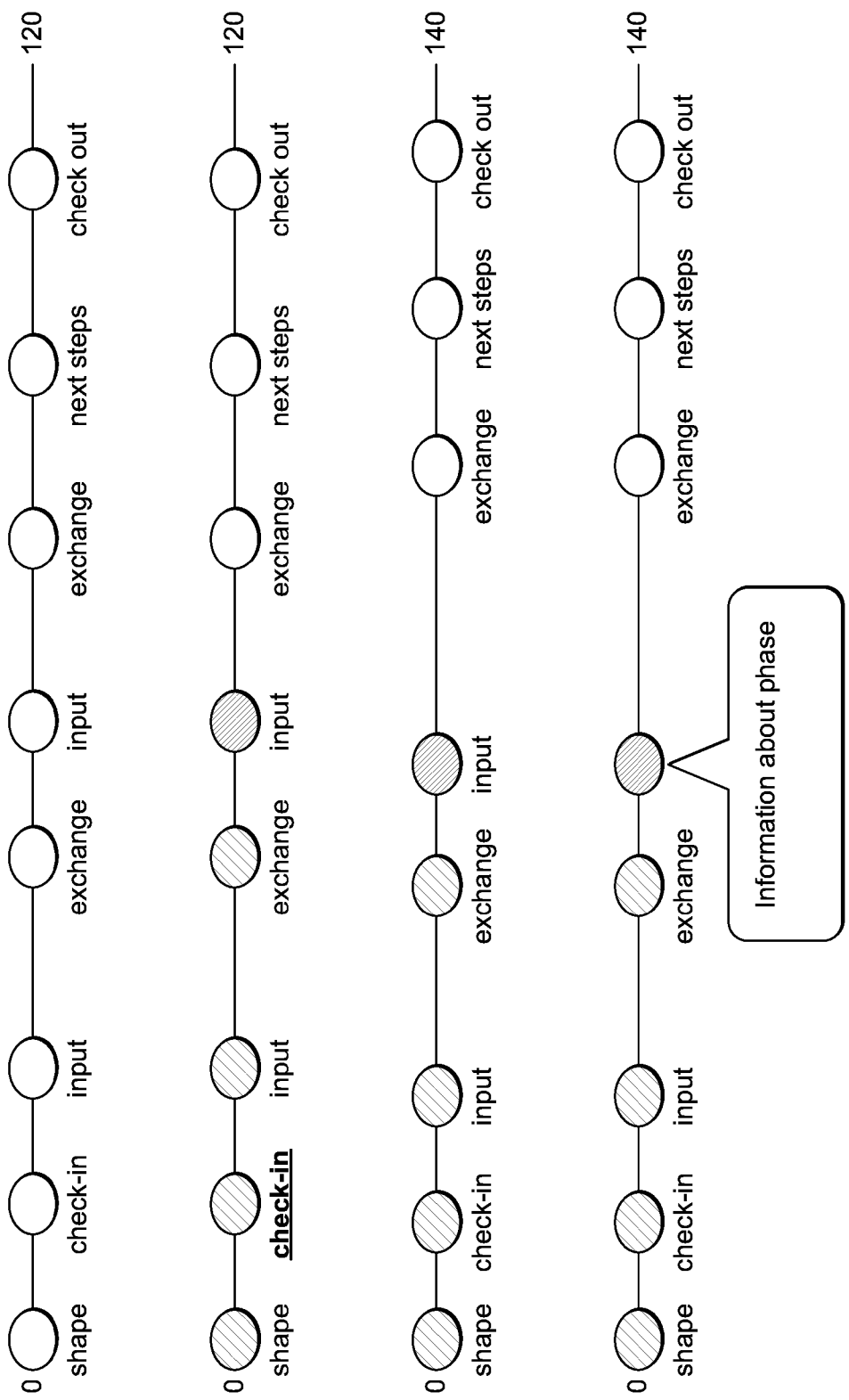
FIG. 10b: shows examples of an interface displaying meeting structure and timing indicators in accordance with an embodiment of the invention.

The conference builder displays a timeline that represents the conference as shown in FIG. 10b.

The timeline is divided into sections: 'opening', 'expanding' and 'closing'.

These sections will have phases that provide structure to the conference to begin (opening), to progress (expanding) and to finish (closing). The phases will be displayed in order along the timeline.

Each phase has specific configurable options that relate to the functionality of the type of phase.

Each phase includes timing variables to define the length of the phase.

Some phases may be optional and some may be required.

In the opening section, the required phases may include the Shape, O3, and Check-in.

In the expanding section, the required phase may be Input, Exchange.

The exchange phases include Q and A, Dialogue, and Decision council.

The conference templates may enable the admin user to build a conference and allocate phases quickly and easily.

The admin user can drag and drop phases within the conference timeline, and alter timings and variables within each phase.

A detailed description of the phases and the variables associated with them will be described below:

As the administrator adds or removes phases, or changes time allocations within phase options the duration of the conference changes dynamically to reflect the changes.

If the administrator passes a cursor over the timeline the circle of participants changes shape to show the state of the conference at this time.

The phase system may have a plug-in architecture that enables new phases to be created by developers and, therefore, new kinds of conferences to be supported. For example, for a learning conference template, several new phases may be developed including a phase where the focus is on a speaker, a phase where the participants are splitting into pairs and work on a task, and a phase where learning during task work is discussed amongst all participants at the end; and for an innovation conference template, a phase where a prototype is reviewed, a phase where feedback given, updates and variations are decided upon and the conference is closed until a new iteration of the prototype.

The plugin architecture may provide for the creation of custom stage plugins and template plugins. The template plugins comprise a set of either standard and/or custom stage plugins. Template plugins and stage plugins can be built and added by the developer of the system or by $3^{rd}$ party developers.

The conference builder may provide suggested phases during building of a conference by the administrator. For example, if an input phase is added, an exchange phase is suggested; or if a string of phases is created without a break phase, a break phase is suggested.

When the conference has been built, the "agenda", forming the arranged phases, can be printed or emailed to participants.

At the beginning of the conference, the participants login to the system and are shown a waiting area.

Figure 11:
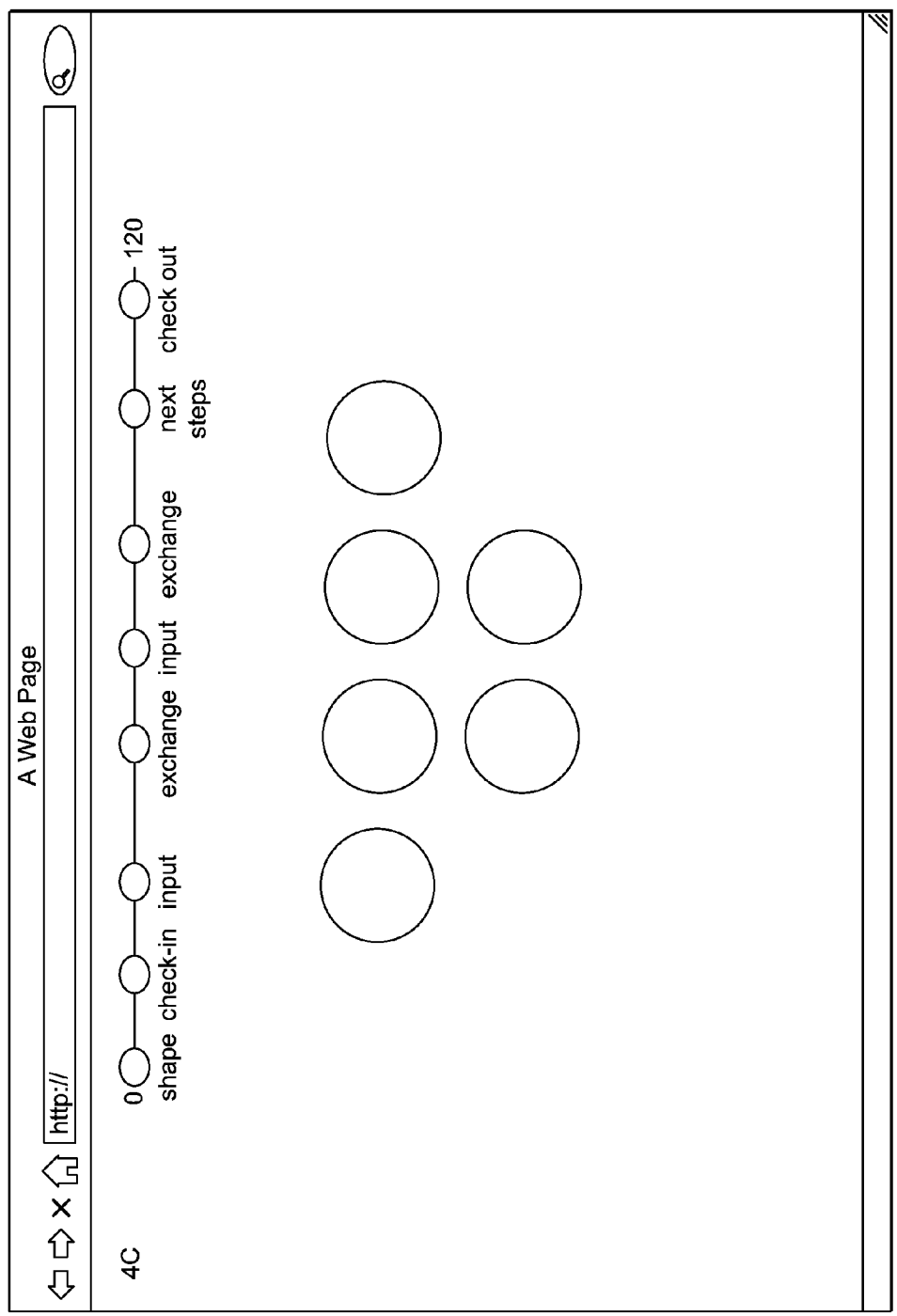
FIG. 11: shows a screenshot of the interface for the waiting phase in accordance with an embodiment of the invention.

The waiting area is a graphical visual display, as shown in FIG. 11, for each participant representing all the participants when they login. Where photographs of participants are provided, the participants' photographs may be shown. Otherwise the names of the participants may be shown. The participants may be shown in a linear format.

Communication between the participants via text, audio or video is possible. The communication is unstructured, in that participants are free to communicate with whomever and whenever they like.

A timeline illustrating the phases of conference in order is also displayed to the participants.

Figure 10C:
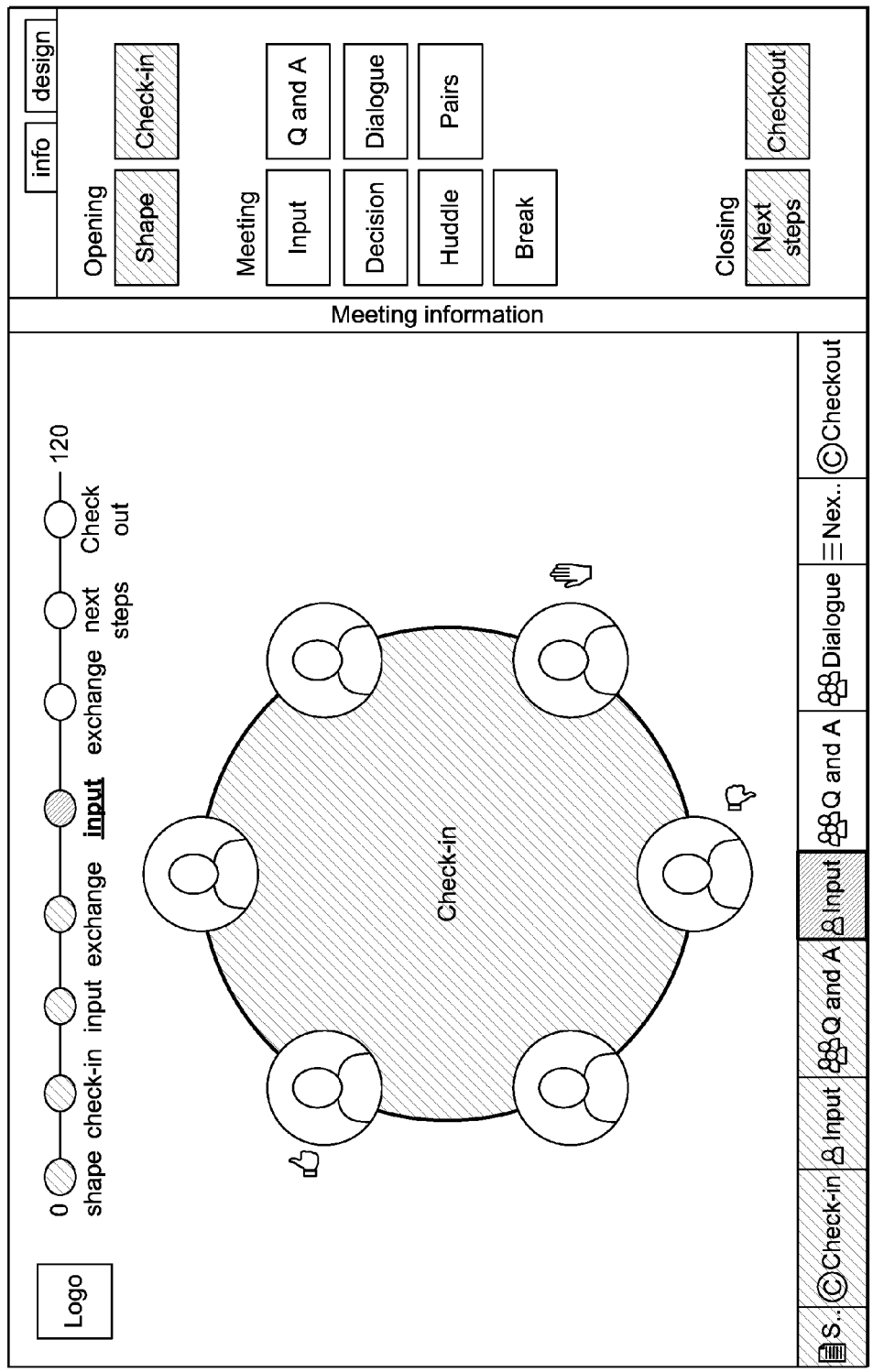
FIG. 10c: shows a screenshot of the interface for the meeting/conference builder/designer in use during the conference in accordance with an embodiment of the invention.

The administrator can modify the phases of conference using the conference builder at any time. A screenshot showing the conference builder being used during a conference is shown at FIG. 10c.

In one embodiment, the conference may be started without any phases selected or configured. During the conference the administrator may then use the conference builder during the conference to construct and configure the phases.

The administrator can select to commence the phases of the conference.

Sometimes not every participant will have arrived by this time and the conference will start without them.

If the participant joins the conference later they will join the current phase.

Different types of phases will now be described. Each of phases have different options which can be configured in the conference builder by the administrator.

The first phase, which will now be described, is the shape phase.

This phase includes the following options: time (the overall duration of this phase), and speaker (administrator or choose).

This phase (not shown in Figures) displays to the user the avatars in a horseshoe shape with the speaker at the top and the participants are lined up below.

The speaker is defined as the administrator by default, but a different participant could be selected in the conference builder.

The structure of the phase enables the speaker to welcome the participants and to discuss the conference purpose and outline.

The purpose of the conference could be defined by a PO3 (Purpose, Objective, Outcome, Outputs).

When this phase is completed, the administrator selects continue.

Another phase, which will now be described, is the O3 phase.

This phase includes the following options: time (the overall duration of this phase), speaker, objective, outcome, and outputs.

The speaker is defined as the administrator by default, but could be a different participant if selected in the conference builder.

An information panel is displayed showing the Objective, Outcome and Outputs defined in the conference builder.

The structure of the phase enables the speaker to introduce the three options. When this phase is completed, the administrator selects continue.

Figure 12:
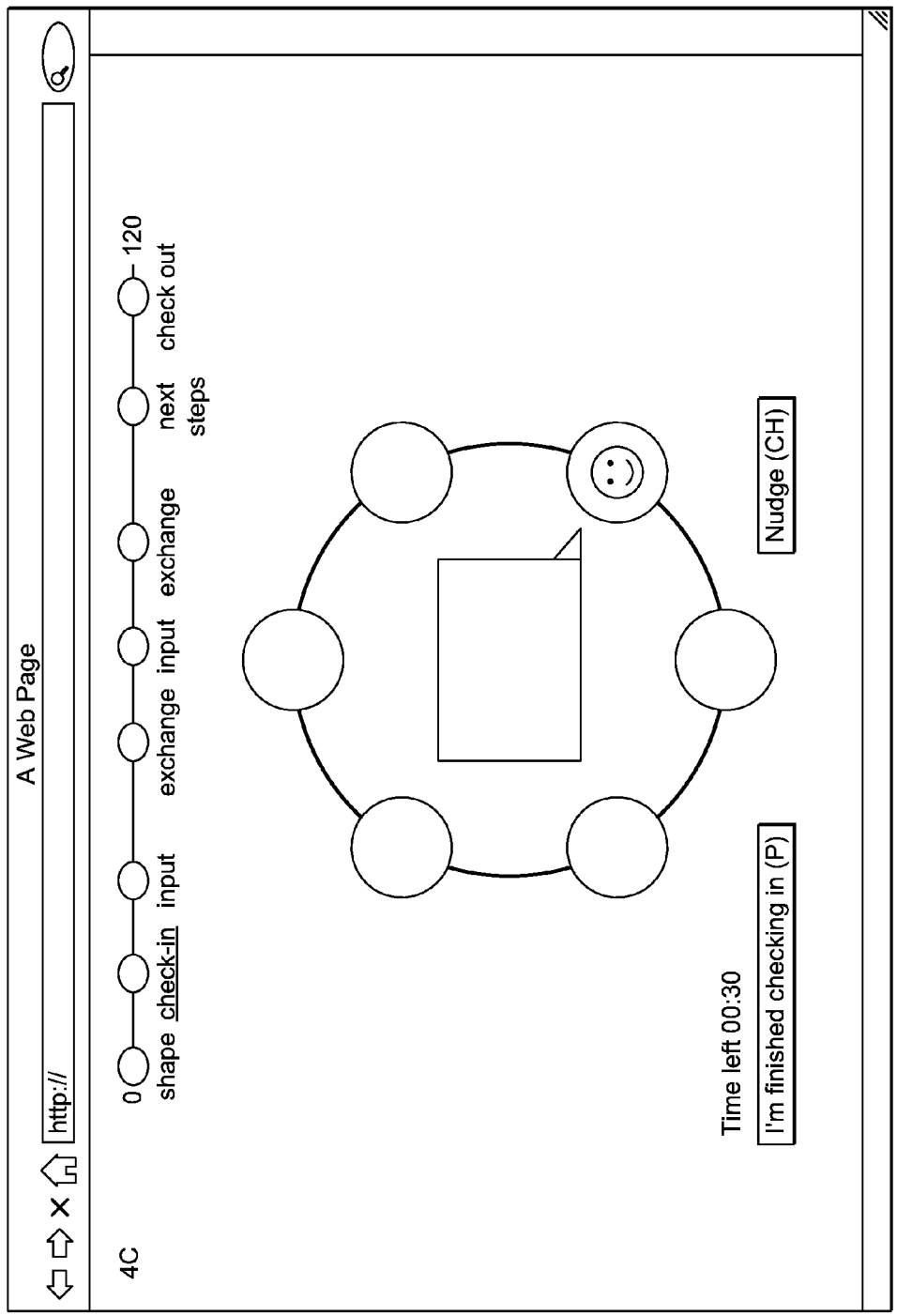
FIG. 12: shows a screenshot of the interface for the check-in phase in accordance with an embodiment of the invention.

Another phase, which will now be described with reference to FIG. 12, is the check-in phase.

This phase includes the following options: type (popcorn, clockwise, anticlockwise), start-with (administrator, choose or first), time (for each participant to speak), and questions (three specified questions). These options may be defined within the conference builder.

This phase displays the avatars in a circle.

If start-with is the administrator, the administrator is automatically the active speaker.

If start-with is 'choose', participants can choose to speak by pressing a button. A hand is displayed next to their avatar. Then administrator can then select an initial participant with a displayed hand. This participant becomes the active speaker.

If start-with is 'first', whoever of the participants selects a button first becomes the active speaker.

The active speaker can then communicate with all of the participants.

The communication is timed. If the active speaker overruns a predefined time, the timeline for the entire conference adjusts itself accordingly. When the speaker indicates that they have finished, a next active speaker out of the participants is selected. Each speaker may use questions in the information panel as guide, to help them to provide a good check-in and to keep within time.

Once the initial speaker is finished (selects a button) the 'type' option denotes the process for selection of the next speaker. If it is 'clockwise' or 'anticlockwise' the next clockwise or anticlockwise, correspondingly, speaker in the circle is selected as the active speaker. If it is 'popcorn', the next active speaker is the next participant to select a button. If multiple participants select the button to speak, the next active speaker after the first participant to select the button is selected in order of which participants were next fastest to select the button to speak.

The administrator is provided with an option to end an active speaker's turn or to move to the next phase at any time.

When the last speaker has completed their turn, the administrator selects continue to move to the next phase in the timeline.

Figure 13:
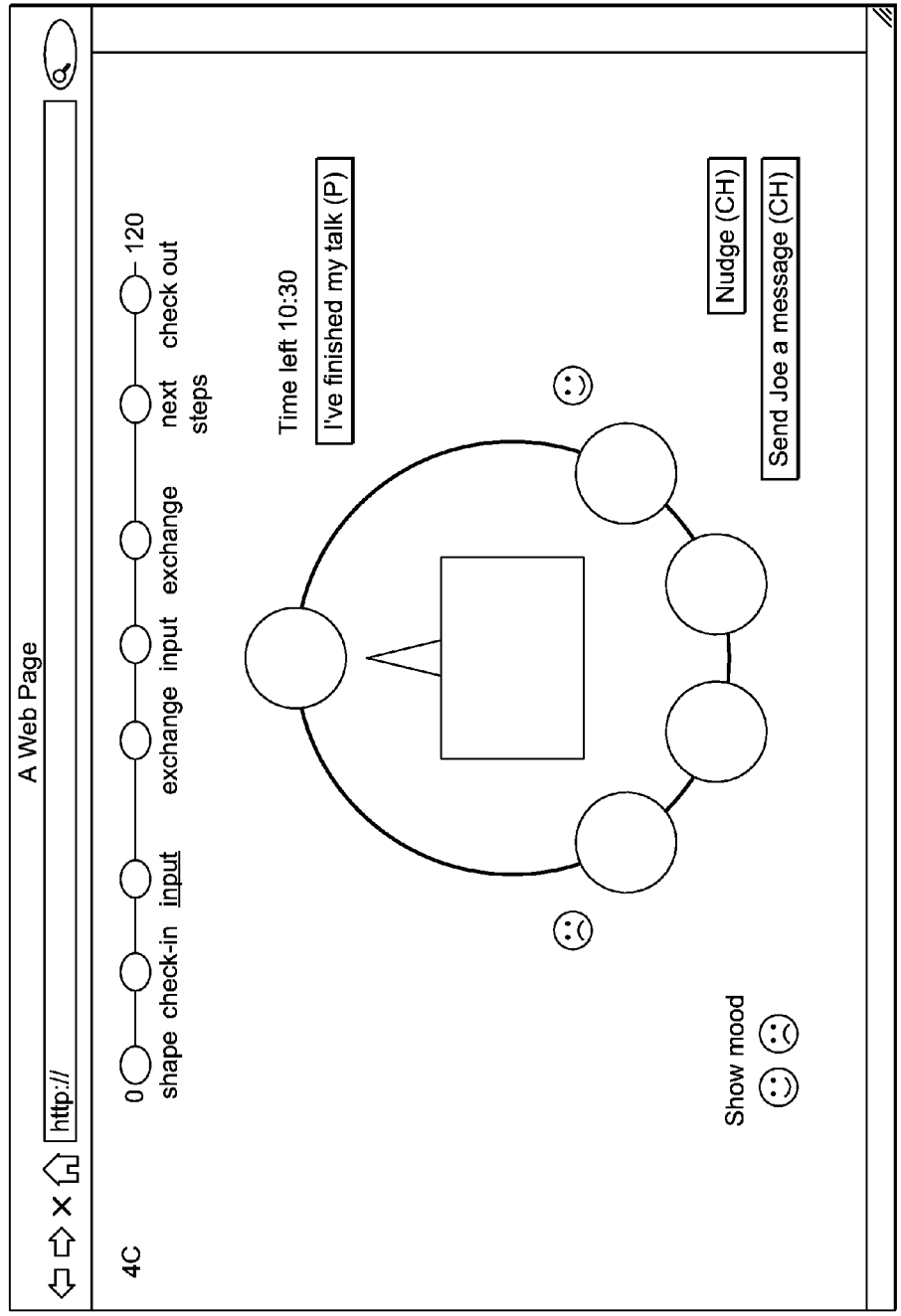
FIG. 13: shows a screenshot of the interface for the input phase in accordance with an embodiment of the invention.
Figure 14:
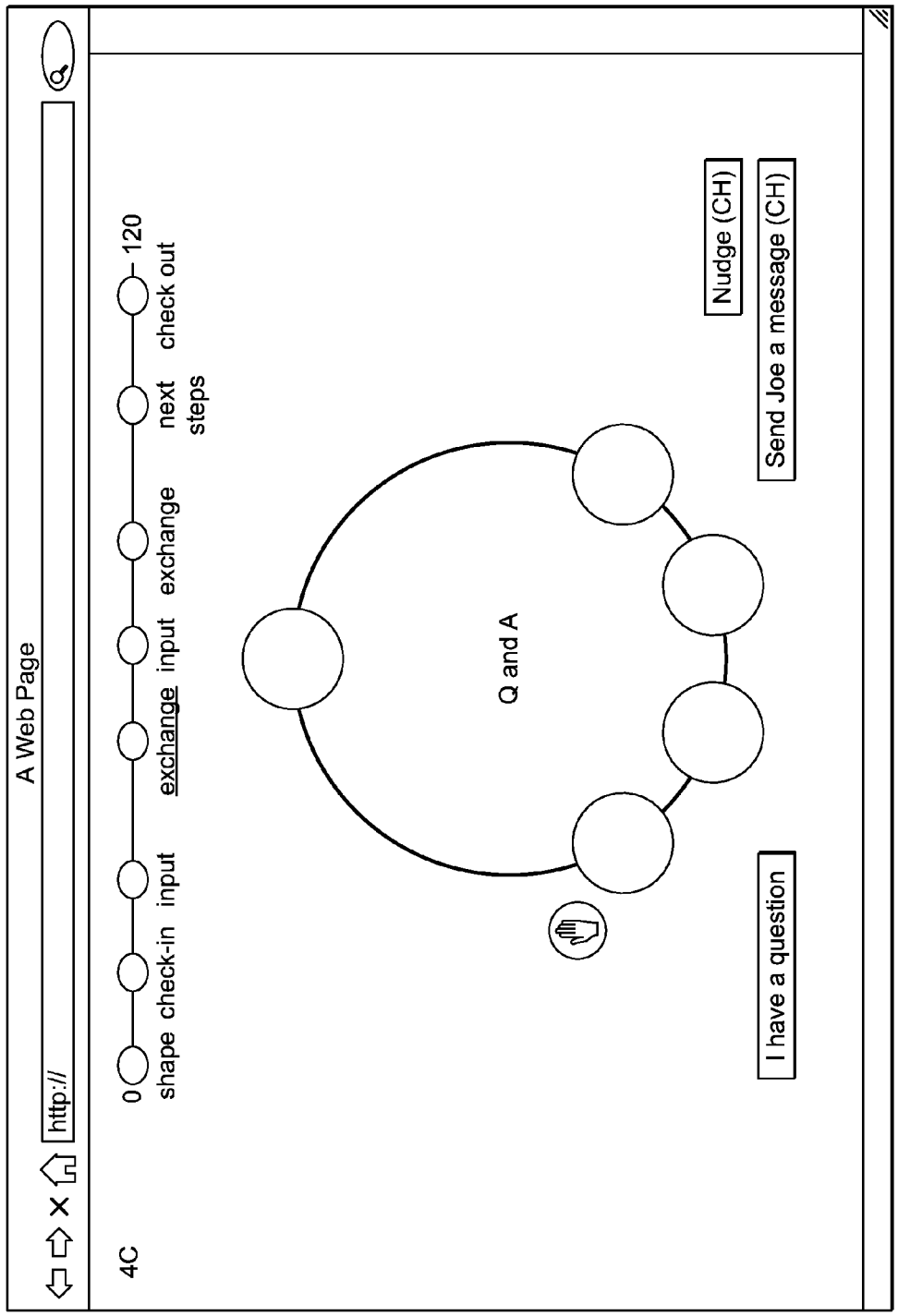
FIG. 14: shows a screenshot of the interface for the question and answer phase in accordance with an embodiment of the invention.
Figure 15:
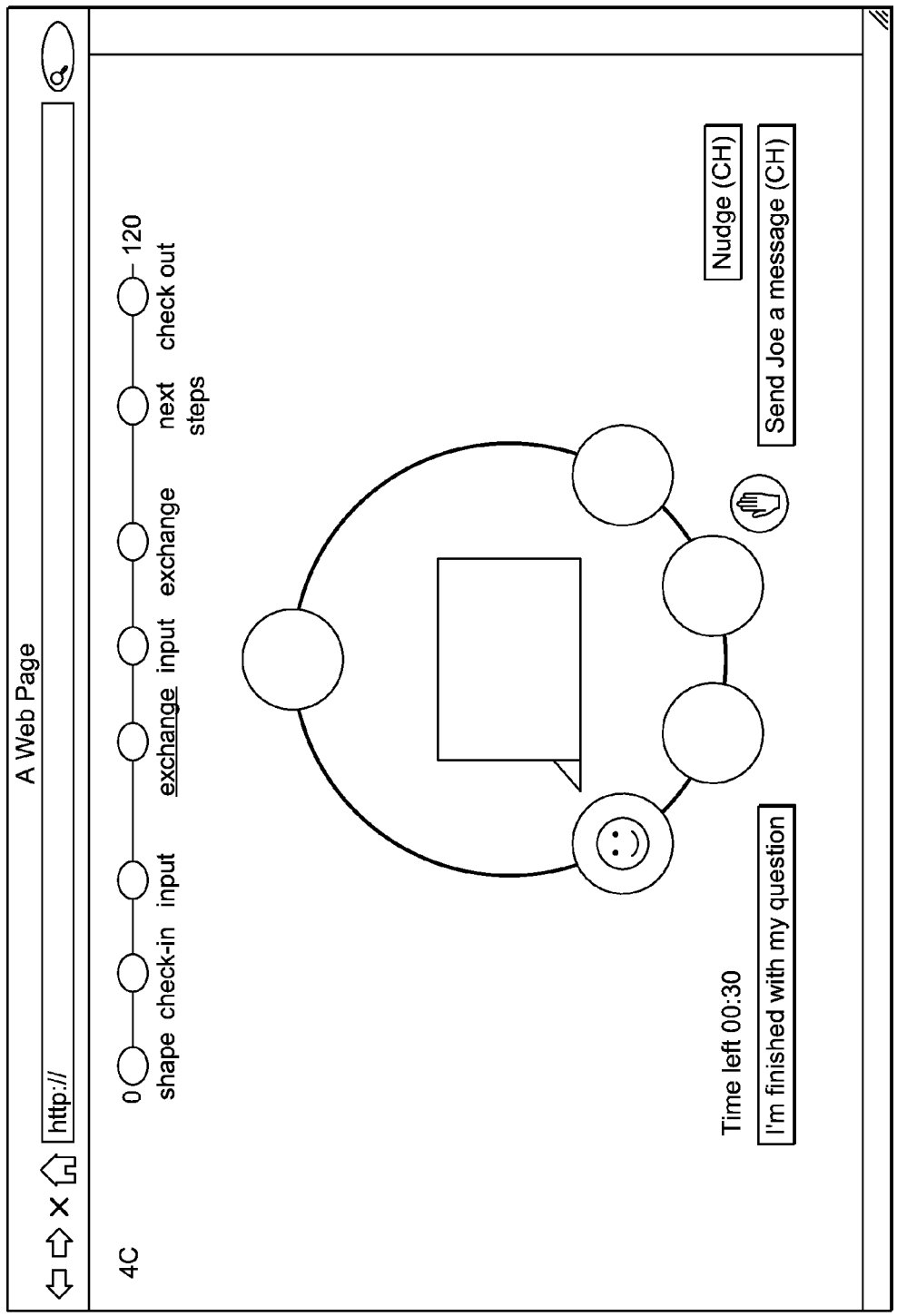
FIG. 15: shows another screenshot of the question and answer phase in accordance with an embodiment of the invention.
Figure 16:
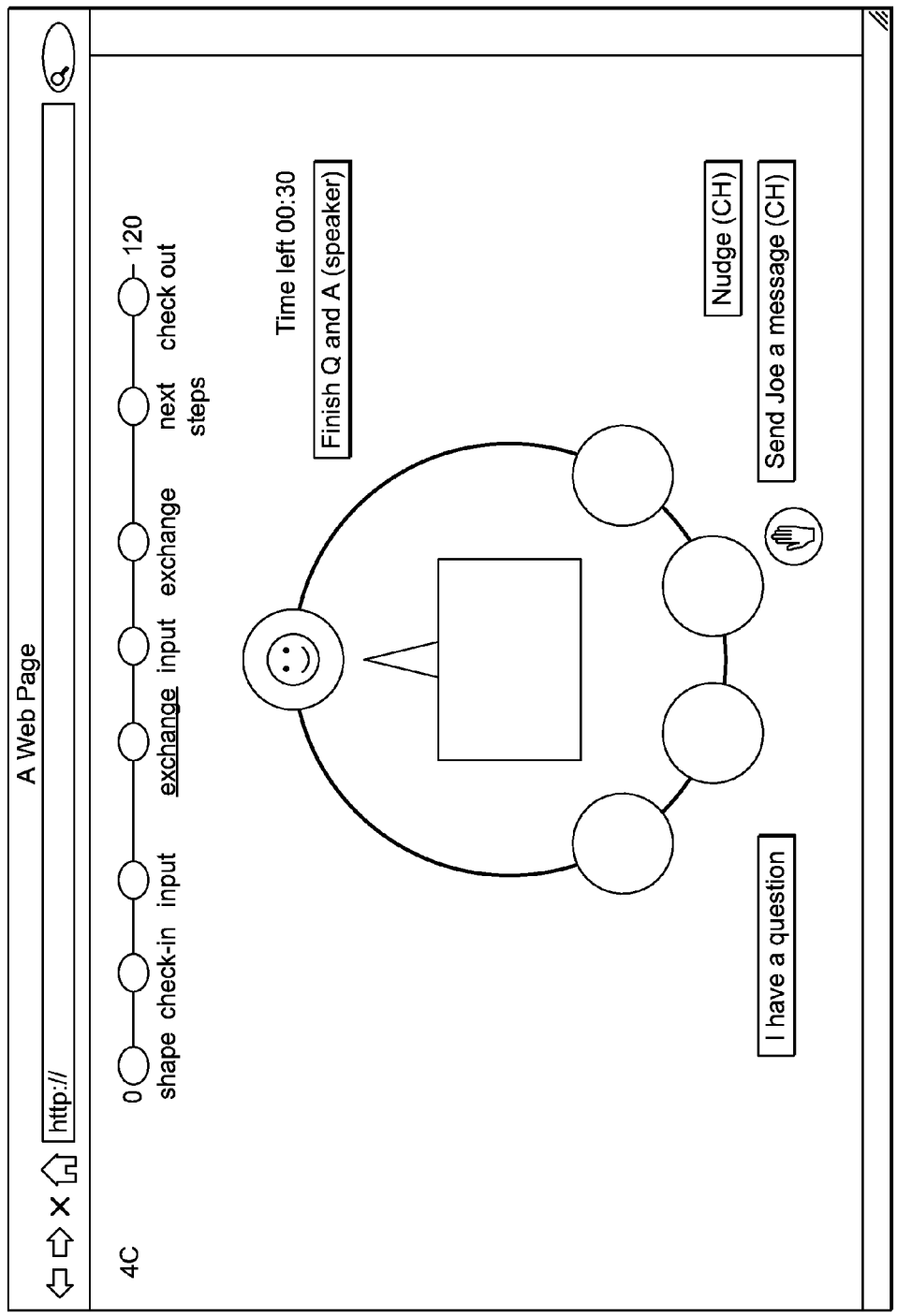
FIG. 16: shows another screenshot of the question and answer phase in accordance with an embodiment of the invention.

Another phase, which will now be described with reference to FIG. 13, is the input phase.

This phase includes the following options: speaker (the participant that is to become the speaker), time (the duration of the speaker's input), title (a title for the input), description (a text string that describes the input), and supporting files (files which are uploaded by the administrator in the conference builder).

This phase displays the avatars in a horseshoe shape.

The defined 'speaker' is selected as the active speaker.

A displayed information panel provides a description of the speaker's input and any supporting files.

The speaker is timed; if they overrun the 'time' the timeline is updated.

Once the speaker is finished they select a button to indicate that they have finished.

When the speaker has finished, the administrator selects continue to move to the next phase in the timeline.

Another phase is the Q and A exchange phase. This phase will be described with reference to FIGS. 14, 15, and 16. This phase must follow an input phase. The speaker for this phase is defined as the speaker from the input phase.

This phase includes the following options: number (of questions), time (time for question), and answer-time (time for answer).

This phase displays the avatars in a horseshoe shape.

The participants select a button to request to speak.

The speaker then chooses which participant can speak. Alternatively, the administrator can select the participant.

The chosen participant is defined as the active speaker and can ask a question.

The participant is timed. If the participant goes over time the time for the phase and thus the entire conference is adjusted upward to reflect the overrun.

The participant selects a button when finished.

The speaker from the input phase becomes the active speaker and can provide input to answer the question.

Then the speaker (or the administrator) can chooses another question request and the process repeats.

When all questions have been answered, or if the time allocated for the phase expires, or the administrator decides—the phase is completed.

At completion of the phase, the administrator selects a button to continue to the next phase.

Another phase, which will now be described, is the dialogue exchange phase.

This phase includes the following options: time (overall time for the phase), start-with (administrator, choose or first), and type ('talking stick', 'popcorn', 'open')

This phase displays the avatars in a circle shape.

If start-with is 'administrator', the administrator is selected as the active speaker.

If start-with is 'choose', participants can choose to speak by pressing a button. A hand is displayed next to their avatar. Then administrator can then select an initial participant with a displayed hand. This participant becomes the active speaker.

If start-with is 'first', whoever of the participants selects a button first becomes the active speaker.

Once an active speaker is selected, the speaker is not timed, but a timer for the entire phase is started.

In type 'talking stick', the active speaker clicks a button next to another participant's avatar to 'pass them the stick'. This participant then becomes the active speaker and can communicate with the participants. This process may continue until the administrator decides to move to the next phase.

In type 'popcorn', the next active speaker is the next participant to select a button. If multiple participants select the button to speak, the next active speaker after the first participant to select the button is selected in order of which participants were next fastest to select the button to speak.

In type 'open', any participant can communicate at any time.

In one embodiment, for the 'open' type participants can select a button at any time to reveal an icon next to their avatar stating that they would like to talk.

The phase is completed when the time allocated for the phase expires, or when the administrator decides.

At completion of the phase, the administrator selects a button to continue to the next phase.

Another phase, which will now be described, is the decision exchange phase.

This phase includes the following options: time (overall time for phase), and type ('10 stones', 'council').

For the type '10 stones', the administrator creates two to ten options, and the participants then place ten 'stones'—for example, 'clicks'—onto the options. The option with the most 'stones'/clicks is defined as the winning option.

For the type 'council', a single option is defined by administrator. Then the participants select either 'yes' or 'not sure'. If participants are unsure they can then communicate with the other participants to say why they are unsure and what they will need to become a 'yes'. The administrator can respond to the participant. The participant can change their vote to 'yes'. The administrator decides if an option has been decided upon or not.

This phase displays the avatars linearly below the option or list of options to decide on.

The options to decide on may be created by the administrator at the beginning of the decision phase or by the speaker from a previous input phase.

In one embodiment, participants can select either 'Agree' or 'Not sure' for one or more of the options. If any participants are not sure, the administrator can select the participant. The selected participant then is designated as the active speaker. Their contribution is timed. If the active speaker overruns a predefined time, the timeline for the entire conference adjusts itself accordingly. The administrator can then respond, or select another participant to contribute. The participants can alter their selection to 'Agree'.

Once the administrator is satisfied with the outcome, the administrator may select a button to continue.

Figure 17:
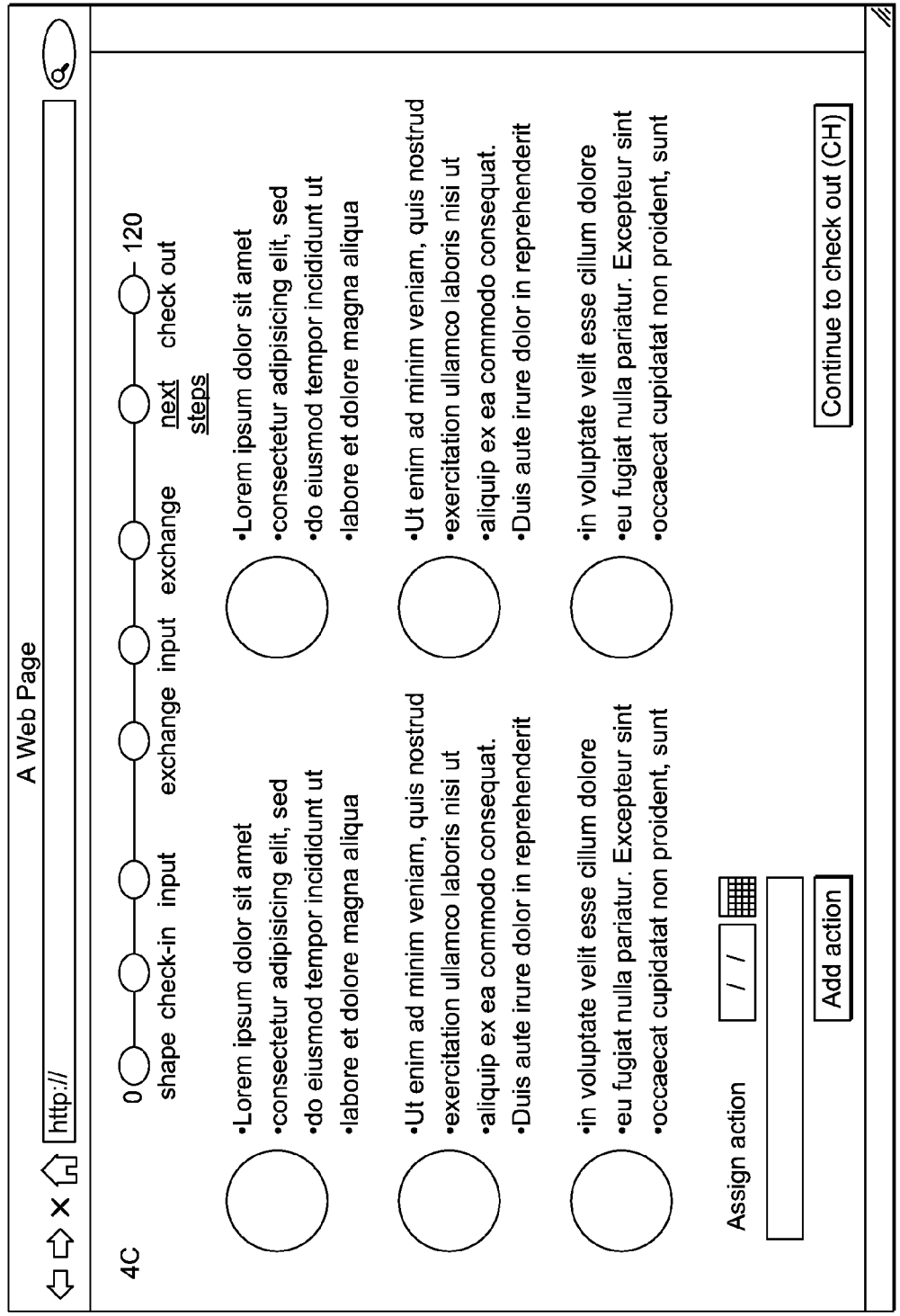
FIG. 17: shows a screenshot of the interface for task allocation in accordance with an embodiment of the invention.

Another phase, which will now be described with reference to FIG. 17, is the next steps phase.

This phase includes the following option: time (overall time for phase).

In this phase, the avatars are displayed linearly. Space for a tasks list for each participant is displayed adjacent to the corresponding avatar.

The system enables the allocation of tasks to participants. The task may include a title and a due date. In one embodiment, tasks are allocated by the administrator only; in an alternative embodiment, tasks are allocated by any participant.

In one embodiment, tasks can be created by any participant at any time during the conference.

Participants can freely communicate with one another while tasks are allocated.

In one embodiment, tasks can be allocated to individuals that are not present. In this case, the avatars of missing team members will be displayed.

Another phase, which will now be described, is the check-out phase.

This phase follows the same process as the check-in phase.

Another phase, which will now be described, is the goodbye phase.

This phase follows the same process as the waiting area phase.

After the conference, the administrator can summarise the conference for non-participants by sending a journal (described later) to other individuals.

Avatars

In the conference interface, as previously mentioned, an avatar represents each participant.

The avatar is either an uploaded image of the participant, or it is their live video stream.

The avatars may be displayed arranged in different shapes in each phase of the conference.

Figure 18:
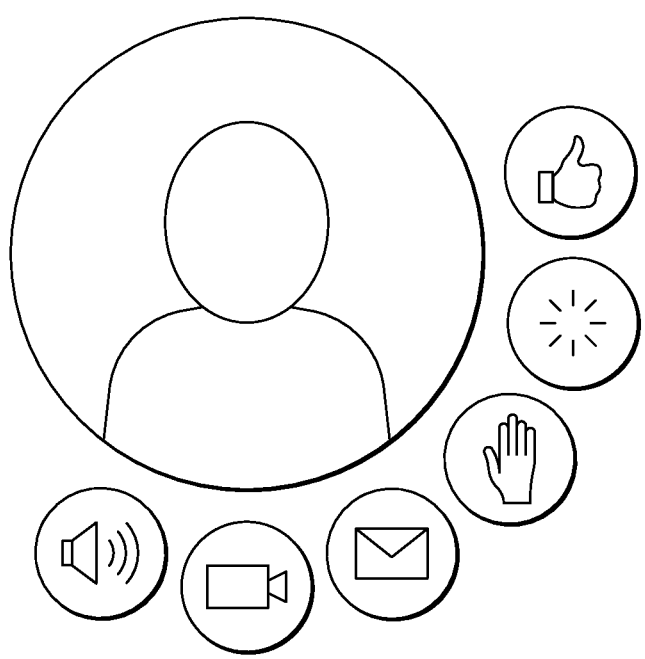
FIG. 18: shows an example of an interface displaying a participant avatar and options in accordance with an embodiment of the invention.

In FIG. 18, functions and status relating to the participants are displayed next to their avatars. For example, their connection status, if the participant wishes to contribute (in some phases), how long the participant has to contribute, and whether the participant is overrunning the time.

The interface for the administrator will display additional functions next to each avatar, including mute the participant's communications channel, remove the participant from the conference, and nudge the participant to signal an end to the participant's current turn or to signal to the participant to provide requested feedback. These functions enable an administrator to target a participant and manipulate their ability to participate or allow the administrator to communicate with them.

Timeline and Timing in the Conference

The timeline shows the start and finishing time so that participants can conceptualise the consequences of overrunning in each area of the conference. As a phase or a part of a phase overruns, the timeline is adjusted automatically to indicate this.

All phases are timed and the timeline adjusts depending on whatever activity takes place within the phases.

For example, in the shape phase the admin speaks for a specified duration. If the speaker goes over this time, the phase visually extends and the timeline adjusts itself proportionally.

Participants can hover their cursor over the different phases in the timeline and further information about that phase will be displayed.

Break

The administrator can initiate a break at any stage. The administrator inputs the length of the break. The system pauses the conference and displays a timer. When participants return, the conference continues from when the break was initiated. Break phases can also be scheduled in the conference builder.

System Communications

The system can use both audio and video communications. In the various phases above an 'active speaker' is described. The speaker's active status means that both their video and audio are active. Alternative embodiments include: every participant's video is enabled but only the active speaker's audio is enabled; every participant's audio and video is enabled, but the avatar of the active speaker is much bigger (i.e. a larger video screen), marked as being dominant over the others (i.e. a display indicator could be used to signal the active speaker), or the audio volume of the active speaker could be increased.

When describing communication within the system in each case a combination of audio and video could be used, or only audio, or only text.

One potential advantage of enabling all participant's video streams but not all audio streams is that participant's can see responses in the faces or the participants without the collective noise and potential audio interruptions from open audio channels from all participants.

Journal

During each phase 'journal' function may be provided by the system. This may be embodied as an input (such as a text box) within the interface that enables a participant to make notes during each phase of the conference. The collection of notes may constitute a journal which is saved in a database for the participant's future reference.

Administrator Nudge

In certain phases the administrator can nudge participants. This nudge can have various meaning such as encouraging a speaker to finish if overrunning or encouraging a speaker to re-engage the audience.

Show Mood

In certain phases participants can show their mood by selecting a button. The mood can be displayed next to their avatar in the interfaces of the other participants.

The mood can indicate happy, unsure and unhappy. The mood may appear for a moment and then disappear. The mood could be represented by a colour or an icon. For example, the icons could be a smiling, blank, and frowning face, to correspond to the above moods. In another example, the icons could be a thumbs up, down and wavering to correspond to the above moods. The display of moods from the participants can give the active speaker feedback as they speak.

Private Messaging

At any point in the conference a participant can message another participant privately. This could appear in the infor-mation panel. In an alternative embodiment, the message could be briefly displayed within the interface.

Information Panel

There may be an information panel displayed on the right of the interface.

The panel can slides in and out within the interface to display the panel and to hide the panel. When a phase starts, if there is any information needed for the phase, the panel can be displayed to slide in to the interface to permit participants to view the extra information.

The extra information may include text, image, video, and files and may be defined in the conference builder.

The information may be supporting information intended for the participants. It may include static instructions to help the administrator understand the process (and thus may only be displayed to the administrator).

It may include dynamic information in some phases that is secondary to the main conference process.

Status and Media Options

In one embodiment, the following options are made available through-out the conference:

The ability to alter video and audio settings;

The ability to mute yourself;

The ability to change status; and

Status shows present or away, connected or disconnected.

The disconnected status occurs when the participant logs out or closes down the system or if their Internet connection is interrupted.

Request to Speak

At any point a participant can request to speak by selecting button. The administrator can either allow or ignore this request. Participants can re-select the button (i.e. re-click a button) to indicate the urgency of their request to speak. In one embodiment, coloured borders are displayed around the participant's avatar to indicate the request to speak and the urgency. The urgency of the request may be indicating by the display of increasingly violent shaking of the avatar within the interface.

Phase Transitions

Each phase is started in the same way. Usually the administrator selects a button to move into the next phase. When this happens the timeline highlights the next phase. The title of the phase appears in the centre of the circle. Then the shape of arranged avatars reform into a new shape (if the phase dictates this). The information panel reveals information relevant to the phase. And the process outlined by the phase begins.

Disconnection Fallbacks

In each phase of the conference participants could be disconnected, either intentionally or unintentionally. When this occurs the system continues the conference. If all participants are disconnected the system pauses the conference in its current phase until participants return.

In all phases the administrator has the ability to move to the next phase. For example, in the input phase they can stop the active speaker from speaking and move onto an exchange phase. If a participant is disconnected during the check in, the administrator can move onto the next phase.

If the administrator is disconnected, the system will assign administrator status to the next participant in order. Alternatively, the administrator can select a fall back order in the conference builder.

A potential advantage of some embodiments of the present invention is that, due to the creation of timings, definition of meeting structure, display of meeting structure, display of meeting progress, control over participant interaction, and/or group allocation of tasks, meetings managed using the invention are more effective and more efficient than conventional unstructured online meetings.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A meeting management method for an audio-visual conferencing system comprising a plurality of user devices, each user device including an audio-visual input and a display, and a server, including:
   receiving inputs from a first user within a graphical user interface at a user device to define a format of a meeting, the format comprising a plurality of stages;
   transmitting the inputs to a processor at the server, the server configured to define the format of the meeting using the input received from the first user;
   wherein, to define the format of the meeting, the first user (1) selects, within the graphical user interface, the plurality of stages from a predefined list of possible stages for the meeting and time allocations for each selected stage, at least one of the selected stages being a break stage, and multiple instances of at least one stage are selected; (2) invites, using the graphical user interface, a plurality of other users to participate in the meeting, and (3) assigns, using the graphical user interface, one or more of the invited users to speak during one or more of the selected stages; and
   facilitating a subsequent audio-visual conference between the plurality of user devices based on the defined format of the meeting.

2. A method as claimed in claim 1, wherein the user defines, within the graphical user interface, the relative locations of the assigned users in the corresponding stages.

3. A method as claimed in claim 2, wherein the relative locations of the assigned users in the corresponding stages define the structure of the meeting process.

4. A meeting management method for an audio-visual conferencing system comprising a plurality of user devices, each user device including an audio-visual input and a display, and a server, the meeting management method including:
   displaying representations for a plurality of users within a GUI at a first display of a first user device of the plurality of user devices, the representations being displayed in an unstructured layout, wherein the plurality of users correspond to participants in an upcoming meeting;
   transmitting a first audio-visual communication received from a user at the first user device to every other user device of the plurality of user devices in an unstructured manner such that each participant can audio-visually communicate with every other participant simultaneously;
   transitioning from the unstructured manner of communication to a structured meeting including a plurality of stages with time allocations, wherein at least one of the stages is a break stage, multiple instances of at least one stage are included in the structured meeting, and one or more of the plurality of users are assigned to speak during one or more of the stages; and
   upon commencing the structured meeting, performing at least one of: receiving a second audio-visual communication from the server or sending a second audio-visual communication to the server, wherein the audio-visual communications are video conferencing communications.

5. A method as claimed in claim 4, including the step of, after the structured meeting has begun, displaying representations for the plurality of users within a GUI of the first user device in a structured layout.

6. A meeting management method for an audio-visual conferencing system comprising a plurality of user devices, each user device including an audio-visual input and a display, and a server, the meeting management method including:
   generating at the server a plurality of nodes corresponding to stages for a meeting including a plurality of stages, wherein one or more of the plurality of stages include time allocations, at least one of the stages is a break stage, multiple instances of at least one stage are included in the meeting, and one or more participants are assigned to speak during one or more of the stages;
   during the meeting, transmitting an indicator to each user device identifying the node corresponding to the current stage of the meeting;
   wherein the server coordinates audio-visual communication between the user devices during at least one stage of the meeting; and
   transmitting a timing indicator for the entire meeting to each user device.

7. A method as claimed in claim 6, further including the step of transmitting a timing indicator for each stage to each user device.

8. A method as claimed in claim 6, wherein the stages of the meeting include a plurality of stages selected from the set of: check-in, input, exchange, next steps, and check-out.

9. A method as claimed in claim 6, wherein the timing indicator for the entire meeting extends if a timing predefined for a stage is exceeded.

10. A meeting management method for an audio-visual conferencing system comprising a plurality of user devices for each participant in a meeting comprising a plurality of stages, one or more of the plurality of stages include time allocations, at least one of the stages being a break stage, multiple instances of at least one stage are included in the meeting, and one or more participants are assigned to speak during one or more of the stages, each user device including an audio-visual input and a display, and a server, the meeting management method including:
   displaying a plurality of meeting participants within a GUI at a first user device of the plurality of user devices, wherein the participants are arranged in a different layout predefined by one of the participants at a second user device of the plurality of user devices for each of at least some of the plurality of stages within the meeting; and
   the first user device being operable to receive audio-visual input from another user via the audio-visual input of the first user device wherein the server permits for the first user device to provide the audio-visual input in accordance with the predefined layout for the current stage of the meeting.

11. A method as claimed in claim 10, wherein, when audio-visual input has ceased, the process proceeding to a structured meeting.

12. A method as claimed in claim 10 wherein the meeting participants originated from a structured meeting.

13. A meeting management method for an audio-visual conferencing system comprising a plurality of user devices with each user device corresponding to a different participant of a plurality of participants in a meeting, each user device including an audio-visual input and a display, and a server, the method including:
- during the meeting including a plurality of stages with time allocations, receiving input from a first participant of the plurality of participants to a meeting to allocate a task to a second participant of the plurality of participants, wherein at least one of the stages is a break stage, multiple instances of at least one stage are included in the structured meeting, and one or more of the participates are assigned to speak during one or more of the stages; and
- managing audio-visual communication between the first participant and the second participant, the first participant and the second participant audio-visually communicating via their respective audio-visual inputs at their respective user devices during task allocation, wherein the audio-visual communication is a video conferencing communication.

14. A method as claimed in claim 13, wherein the task allocation includes inputting a title for the task and a due date for the task.

15. A meeting management system, including:
- a plurality of user devices, each user device including an audio-visual input device and a display device, wherein at least one user device is configured to receive input from a user of said user device within a graphical user interface displayed on the display device of said user device to define a format of a meeting, the format comprising a plurality of stages; and
- a server configured to manage audio-visual communications between the user devices, to receive the input from the user device and to define the format of a meeting;
- wherein, to define the format of the meeting, the user of the least one user device (1) selects, within the graphical user interface, the plurality of stages from a predefined list of possible stages and time allocations for each selected stage, at least one of the selected stages being a break stage, and multiple instances of at least one stage are selected, (2) invites, using the graphical user interface, a plurality of other users to participate in the meeting, and (3) assigns, using the graphical user interface, one or more of the invited users to speak during one or more of the selected stages.

16. A meeting management system, including:
- a plurality of user devices, each user device including an audio-visual input device and a display device configured to display representations for a plurality of users within a GUI in an unstructured layout, wherein the plurality of users correspond to participants in an upcoming meeting; and
- a server configured to coordinate transmission of unstructured audio-visual communication amongst the plurality of user devices such that each participant can audio-visually communicate with every other participant simultaneously and to receive input from at least one user device to determine when a structured meeting will begin, the structured meeting including a plurality of stages with time allocations, wherein at least one of the stages is a break stage, multiple instances of at least one stage are included in the structured meeting, and one or more of the plurality of participants are assigned to speak during one or more of the stages,
- wherein the audio-visual communications are video conferencing communications.

17. A meeting management system, including:
- a plurality of user devices, each user device including an audio-visual input device and a display device configured to display an indicator identifying the node corresponding to the current stage of a meeting including a plurality of stages, wherein one or more of the plurality of stages include time allocations, at least one of the stages is a break stage, multiple instances of at least one stage are included in the meeting, and one or more participants are assigned to speak during one or more of the stages; and
- a server configured to manage audio-visual communications between the user devices, to generate a plurality of nodes corresponding to stages for a meeting, and to transmit a timing indicator for the entire meeting to each user device.

18. A meeting management system, including:
- a plurality of user devices, each user device including an audio-visual input device and a display device configured to display a plurality of meeting participants within a GUI on a user device of each participant, wherein the participants are arranged in a layout defined by one of the participants; and
- a server configured to (1) manage audio-visual communications between the user devices during a meeting comprising a plurality of stages, (2) to receive input from one or more of the meeting participants via their user devices, and (3) to transmit the input to the user devices of the other participants, wherein each participant has an opportunity to provide input in accordance with the layout,
- wherein the participants are arranged in a different layout predefined by one of the participants for each of at least some of the plurality of stages within the meeting, one or more of the plurality of stages include time allocations, at least one of the stages is a break stage, multiple instances of at least one stage are included in the meeting, and one or more participants are assigned to speak during one or more of the stages.

19. A meeting management system, including:
- a plurality of user devices for a plurality of meeting participants, each user device including an audio-visual input device and each user device configured to receive input from a user of said device during a meeting including a plurality of stages with time allocations, wherein at least one of the stages is a break stage, multiple instances of at least one stage are included in the structured meeting, and one or more of the participates are assigned to speak during one or more of the stages; and
- a server configured to manage audio-visual communications between the user devices, to receive input from a user device of one of the plurality of meeting participants to allocate a task to another one of the plurality of meeting participants, to receive communication from a user device of at least one other participant during the input and to coordinate delivery of the task from the at least one other participant to every other participant, wherein the audio-visual communication is a video conferencing communication.

20. A method as claimed in claim 13 further comprising, receiving another input from the first participant of the plurality of participants to allocate another task to a user who is not a participant of the meeting.

\* \* \* \* \*